United States Patent
Muchherla et al.

(10) Patent No.: US 11,693,767 B2
(45) Date of Patent: *Jul. 4, 2023

(54) PERFORMING A MEDIA MANAGEMENT OPERATION BASED ON CHANGING A WRITE MODE OF A DATA BLOCK IN A CACHE

(71) Applicant: Micron Technology, Inc., Boise, ID (US)

(72) Inventors: Kishore Kumar Muchherla, Fremont, CA (US); Peter Feeley, Boise, ID (US); Sampath K. Ratnam, Boise, ID (US); Ashutosh Malshe, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/480,214

(22) Filed: Sep. 21, 2021

(65) Prior Publication Data

US 2022/0004491 A1  Jan. 6, 2022

Related U.S. Application Data

(63) Continuation of application No. 16/737,662, filed on Jan. 8, 2020, now Pat. No. 11,157,400.

(51) Int. Cl.
*G06F 12/02* (2006.01)
*G06F 11/30* (2006.01)
(Continued)

(52) U.S. Cl.
CPC ...... *G06F 12/0246* (2013.01); *G06F 11/3037* (2013.01); *G06F 12/0253* (2013.01); *G06F 12/0811* (2013.01); *G06F 12/0871* (2013.01)

(58) Field of Classification Search
CPC ............ G06F 11/3037; G06F 11/3409; G06F 12/0246; G06F 12/0253; G06F 12/0811;
(Continued)

(56) References Cited

U.S. PATENT DOCUMENTS 10,209,902 B1   2/2019   Sheredy et al.
2012/0185638 A1*   7/2012   Schreiber .............. G06F 16/122
                                                        711/E12.008

(Continued)

OTHER PUBLICATIONS

PCT Notification of Concerning Transmittal of International Preliminary Report on Patentability for PCT Application No. PCT/US2021/012782, dated Jul. 21, 2022, 7 pages.

(Continued)

*Primary Examiner* — Hashem Farrokh
(74) *Attorney, Agent, or Firm* — Lowenstein Sandler LLP

(57) ABSTRACT

A method includes receiving, by a processing device, an indication that a media management operation performed with respect to a block of a memory sub-system satisfies a performance condition, wherein the block maintains first data stored using a first write mode, in response to receiving the indication, determining, by the processing device, that a cache block of a cache area of the memory sub-system satisfies an endurance condition, wherein the cache block maintains second data stored using a second write mode, and changing, by the processing device, a write mode for the cache block from the second write mode to the first write mode responsive to determining that the cache block satisfies the endurance condition.

20 Claims, 5 Drawing Sheets

(51) Int. Cl.
*G06F 12/0811* (2016.01)
*G06F 12/0871* (2016.01)

(58) Field of Classification Search
CPC ............. G06F 12/0871; G06F 2201/81; G06F 2212/7205
USPC ................................................ 711/154, 103
See application file for complete search history.

(56) References Cited

U.S. PATENT DOCUMENTS

| | | |
|---|---|---|
| 2014/0344524 A1 | 11/2014 | Shalvi et al. |
| 2015/0026394 A1 | 1/2015 | Park et al. |
| 2016/0070474 A1* | 3/2016 | Yu .......................... G06F 3/0608 |
| | | 711/103 |
| 2016/0092114 A1 | 3/2016 | Zhang et al. |
| 2018/0081543 A1* | 3/2018 | Muchherla ............ G06F 3/0653 |
| 2019/0369899 A1 | 12/2019 | Tanpairoj et al. |

OTHER PUBLICATIONS

PCT Notification of Transmittal of the International Search Report and the Written Opinion of the International Searching Authority for PCT Application No. PCT/US2021/012782, dated May 3, 2021, 10 pages.
USPTO, Office Action for U.S. Appl. No. 16/737,662, dated Apr. 1, 2021.
USPTO, Notice of Allowance for U.S. Appl. No. 16/737,662, dated Jun. 29, 2021.

* cited by examiner

PERFORMING A MEDIA MANAGEMENT OPERATION BASED ON CHANGING A WRITE MODE OF A DATA BLOCK IN A CACHE

RELATED APPLICATION

The present application is a Continuation of U.S. patent application Ser. No. 16/737,662 filed on Jan. 8, 2020, which is incorporated herein by reference in its entirety for all purposes.

TECHNICAL FIELD

The present disclosure generally relates to a memory sub-system, and more specifically, relates to performing a media management operation based on changing a write mode of a data block in a cache for memory sub-systems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
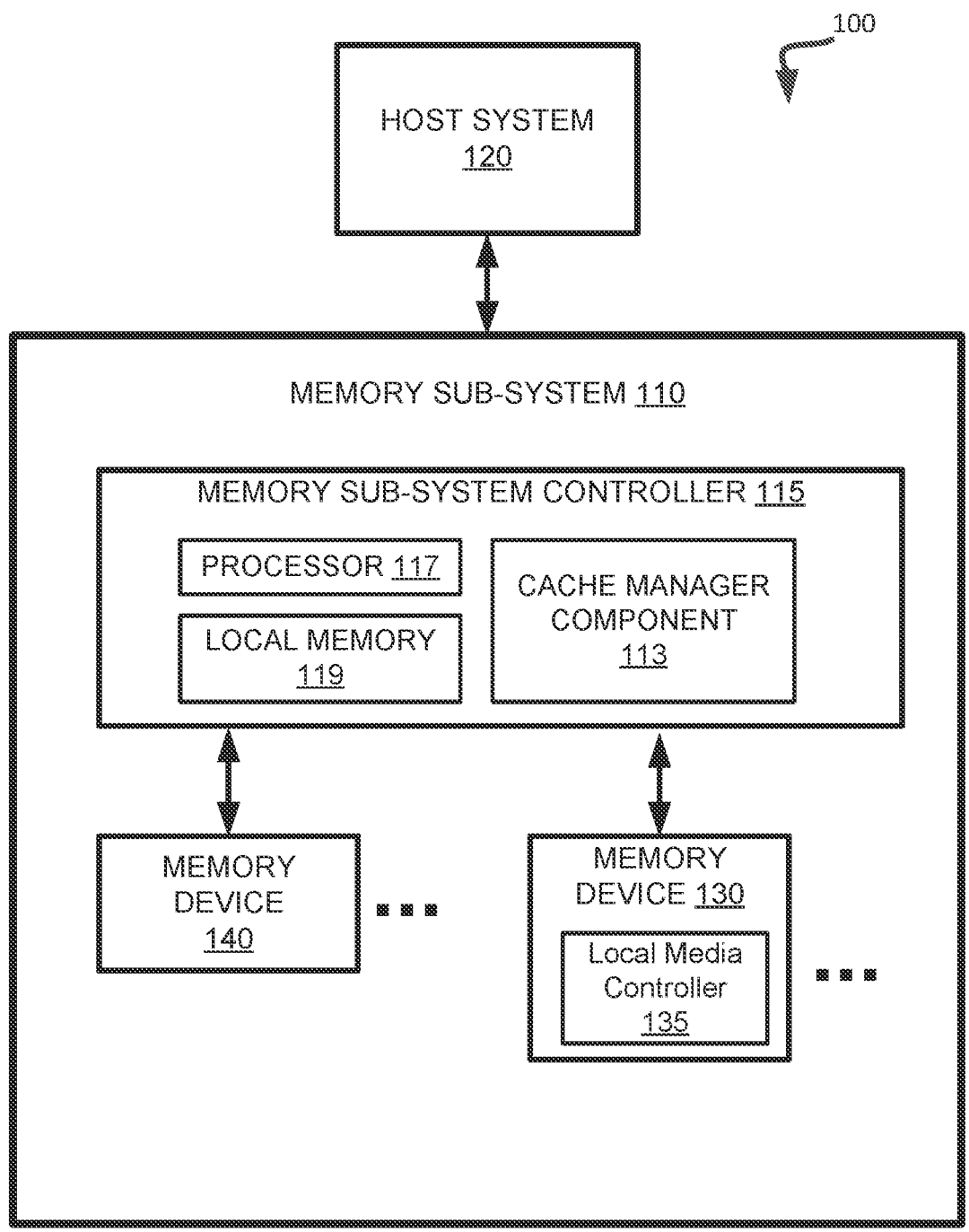
FIG. 1 illustrates an example computing system that includes a memory sub-system in accordance with some embodiments of the present disclosure.

Aspects of the present disclosure are directed to performing a media management operation based on changing a write mode of a data block in a cache for memory sub-systems. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. A non-volatile memory device is a package of one or more dice. Each die can consist of one or more planes. For some types of non-volatile memory devices (e.g., negative-and (NAND) devices), each plane consists of a set of physical blocks. Each block consists of a set of pages. Each page consists of a set of memory cells, which store bits of data. For some memory devices, such as NAND devices, blocks are the smallest area than can be erased and pages within the blocks cannot be erased individually. For such devices, erase operations are performed one block at a time.

A page of a block can contain valid data, invalid data, or no data. Invalid data is data that is marked as outdated as a new version of the data is stored on the memory device. Invalid data includes data that was previously written but is no longer associated with a valid logical address, such as a logical address referenced by a host system in a physical to logical (P2L) mapping table. Valid data is the most recent version of such data being stored on the memory device. A memory sub-system can mark data as invalid based on information received, for example, from an operating system. A page that does not contain data includes a page that has been previously erased, and not yet written to.

A memory sub-system controller can perform operations for media management algorithms, such as wear leveling, refresh, garbage collection, scrub, etc. A block may have some pages containing valid data and some pages containing invalid data. To avoid waiting for all of the pages in the block to have invalid data in order to erase and reuse the block, an algorithm hereinafter referred to as "garbage collection" can be invoked to allow the block to be erased and released as a free block for subsequent write operations. Garbage collection is a set of media management operations that include, for example, selecting a block that contains valid and invalid data, selecting pages in the block that contain valid data, copying the valid data to new locations (e.g., free pages in another block), marking the data in the previously selected pages as invalid, and erasing the selected block.

"Garbage collection" hereinafter refers to selecting a block, rewriting the valid data from the selected block to another block, and erasing all invalid data and valid data stored at the selected block. The valid data from multiple selected blocks can be copied to a smaller number of other blocks and the selected blocks can then be erased. As a result, the number of blocks that have been erased can be increased such that more blocks are available to store subsequent data from a host system.

A memory sub-system can implement a garbage collection operation to maintain or generate a continuous supply of free data blocks to host applications for storing data. Garbage collection is an operation to copy valid data from one data block to another data block. The source data block (e.g., the data block that the valid data is copied from) can then be erased and released as free block for subsequent host writes. This additional re-write of valid data in the data blocks during a garbage collection operation results in Write Amplification. Write Amplification can reduce the operating life and impact performance of the memory sub-system. The memory sub-system can include some amount of additional blocks in excess of the logical size of the memory device that is exposed as user space. This additional space is typically referred to as Over Provisioning or OP. The efficiency of garbage collection operations can often be a function of the OP for the memory sub-system. During garbage collection, additional space from OP helps to reduce the Write Amplification. A larger amount of OP can reduce the Write Amplification by reducing the number of times garbage collection re-writes valid data within the memory sub-system to free up data blocks. For example, for a memory device that exposes a user space size of 128 Gigabytes (Gb), if the physical size is 140 Gb, the OP is 12 Gb. In such instances, garbage collection operations can become less efficient than for devices with the same user space size, but with a larger OP size since the smaller OP space provides less additional space that may be used during garbage collection to reduce the impact of Write Amplification when clearing data blocks of unneeded data.

Memory devices can include one or more arrays of memory cells such as single-level cell (SLC) memory, multi-level cell (MLC) memory, triple-level cell (TLC) memory, or quad-level cell (QLC) memory. Each type can have a different data density, which corresponds to an amount of data (e.g., bits of data) that can be stored per memory cell of a memory device. Using the example of a flash based memory, a triple-level cell (TLC) can store three bits of data while a single-level cell (SLC) can store one bit of data. Accordingly, a memory device including TLC memory cells will have a higher data density than a memory device including SLC memory cells. Additionally, each type of memory cell can have different endurance for storing data. The endurance of the memory device is the number of write operations or a number of program/erase operations performed on a memory cell of the memory device before data can no longer be reliably stored at the memory cell. For example, SLC memory cells that have a lower data density can have higher endurance threshold than TLC memory cells that have a higher data density. In some instances SLC memory cells can have an endurance threshold in the range of 3 to 40 times higher than that of TLC memory cells. Accordingly, SLC memory cells can store less total data, but can be used for longer periods of time while TLC memory cells can store more total data, but can be used for shorter periods of time.

Conventional memory sub-systems can further configure memory devices such that a portion of the OP space can be reserved for other purposes. For example, some portion of the OP can be reserved to store firmware-related information. Similarly, a portion of the OP space can be provisioned as static cache to provide improved performance for I/O operations. The remainder of the OP after the reserved areas are allocated is typically referred to as the operating OP. Accordingly, increasing the size of the cache area can reduce the operating OP. The blocks reserved for the static cache area can be configured with memory cells of a lower data density to provide higher endurance thresholds for writing user data to the memory device. For example, a block capable of being configured as QLC can be configured with memory cells of lower data density, such as SLC, MLC, or TLC. Similarly, a block capable of being configured as TLC can be configured with memory cells of a lower data density such as SLC or MLC. Once configured, the blocks reserved for static cache are typically configured in this way for the life of the device and are not later reconfigured as memory cells with higher data density.

Conventional memory sub-systems that are configured in this manner can provide long-term performance benefits to host I/O operations due to the allocation of the cache with memory cells that have a higher endurance due to a lower data density. These configurations, however, can have lower random write performance for write-intensive workloads due to the reduction in operating OP available during garbage collection operations. During such periods of write-intensive workload, the entire user space and operating OP of the memory device can become full, which can result in triggering garbage collection for maintaining free block balance. This condition is typically referred to as a "steady state" condition, in which the garbage collection occurs in the foreground or simultaneously with host data writes. Conventional memory sub-systems do not provide access to the static cache area for garbage collection operations. As a result, the reduced operating OP significantly increases the level of write amplification, resulting in a reduction in random write performance for write-intensive workloads under steady state conditions.

Aspects of the present disclosure address the above and other deficiencies by performing a garbage collection operation based on changing a write mode of a data block in a cache for memory sub-systems. A cache manager can monitor workload activity (e.g., observed write amplification) and during periods of steady state conditions can enable the use the static cache area to supplement operating OP until the steady state conditions subside. For example, during steady state conditions where a garbage collection operation is being executed, the current workload conditions for the memory device may be assessed in terms of write amplification. If, during steady state workloads, the measured write amplification rises to a level sufficient to satisfy a threshold performance condition, then the cache manager can determine whether or not to use the static cache area to supplement the operating OP. Additionally, in some implementations, the cache manager can assess the endurance of data blocks in the state cache to determine whether or not to use the static cache area to supplement the operating OP. In such instances, a static cache endurance threshold may be used that is a function of the ratio of cell degradation in higher data density mode to lower data density mode. In some implementations, the cache manager can temporarily change the write mode of the data blocks in the cache area from SLC to a mode that provides higher data density (e.g., MLC, TLC, QLC, etc.) and make the cache area available to garbage collection operations during the steady state conditions. When the steady state conditions subside (e.g., when the write amplification drops), and/or the data blocks in the static cache area do not satisfy an endurance condition, the cache manager can change the write mode of the cache area back to SLC and reinstate the restriction that prevents garbage collection operations from utilizing the cache area under normal workloads.

Advantages of the present disclosure include, but are not limited to, increased write performance as well as increased foreground garbage collection efficiency during periods of write-intensive workload. Switching the write mode of data blocks in the cache to a mode with a higher data density can provide increased OP for garbage collection during periods of write-intensive workload, which can reduce write amplification during those periods. Additionally, by monitoring the Write Amplification under workload to intelligently enabling the static cache for use with garbage collection, any additional endurance impact on the blocks of the cache area can be minimized by restricting the mode switching to those periods where performance is most degraded. Moreover, by utilizing the cache area to supplement the operating OP, the number of blocks deliberately allocated for cache can be increased for the life of a memory sub-system. Thus, the benefits of an increased cache size can be realized for the entire life of the memory sub-system (e.g., improved write performance during normal workload conditions) while still achieving the benefits of larger operating OP for write-intensive workloads during the early life of the memory sub-system.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components or devices), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fiber Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations (e.g., in response to commands scheduled on a command bus by controller 116). The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device 117 (processor) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

In some implementations, memory sub-system 110 can use a striping scheme, according to which every the data payload (e.g., user data) utilizes multiple dies of the memory devices 130 (e.g., NAND type flash memory devices), such that the payload is distributed through a subset of dies, while the remaining one or more dies are used to store the error correction information (e.g., parity bits). Accordingly, a set of blocks distributed across a set of dies of a memory device using a striping scheme is referred herein to as a "superblock."

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a cache manager component 113 that can be used to perform a media management operation, for example, a garbage collection operation, based on changing a write mode of a data block in a cache for data blocks stored at the memory devices 130. In some embodiments, the controller 115 includes at least a portion of the cache manager component 113. For example, the controller 115 can include a processor 117 (processing device) configured to execute instructions stored in local memory 119 for performing the operations described herein. In some embodiments, the cache manager component 113 is part of the host system 120, an application, or an operating system.

The cache manager component 113 can monitor workload conditions (e.g., the observed write amplification) of the memory sub-system 110, and if the performance of a garbage collection operation satisfies a performance condition (e.g., if the observed write amplification indicates that the memory sub-system 110 is operating under steady state conditions), the cache manager component 113 can determine whether a block in the cache area of memory devices 130 satisfies an endurance condition. If both conditions are met, the cache manager component 113 can change the write mode for a data block in the cache area from a low data density mode (e.g., SLC) to a write mode with a higher data density (e.g., MLC, TLC, QLC, etc., hereinafter referred to collectively as XLC), and use that data block in the garbage collection operation. Additionally, once the workload conditions indicate that the steady state performance condition is no longer present, the cache manager component 113 can switch the write mode for subsequent data blocks in the cache area back to their original data density (e.g., back to SLC). Further details with regards to the operations of the cache manager component 113 are described below.

Figure 2:
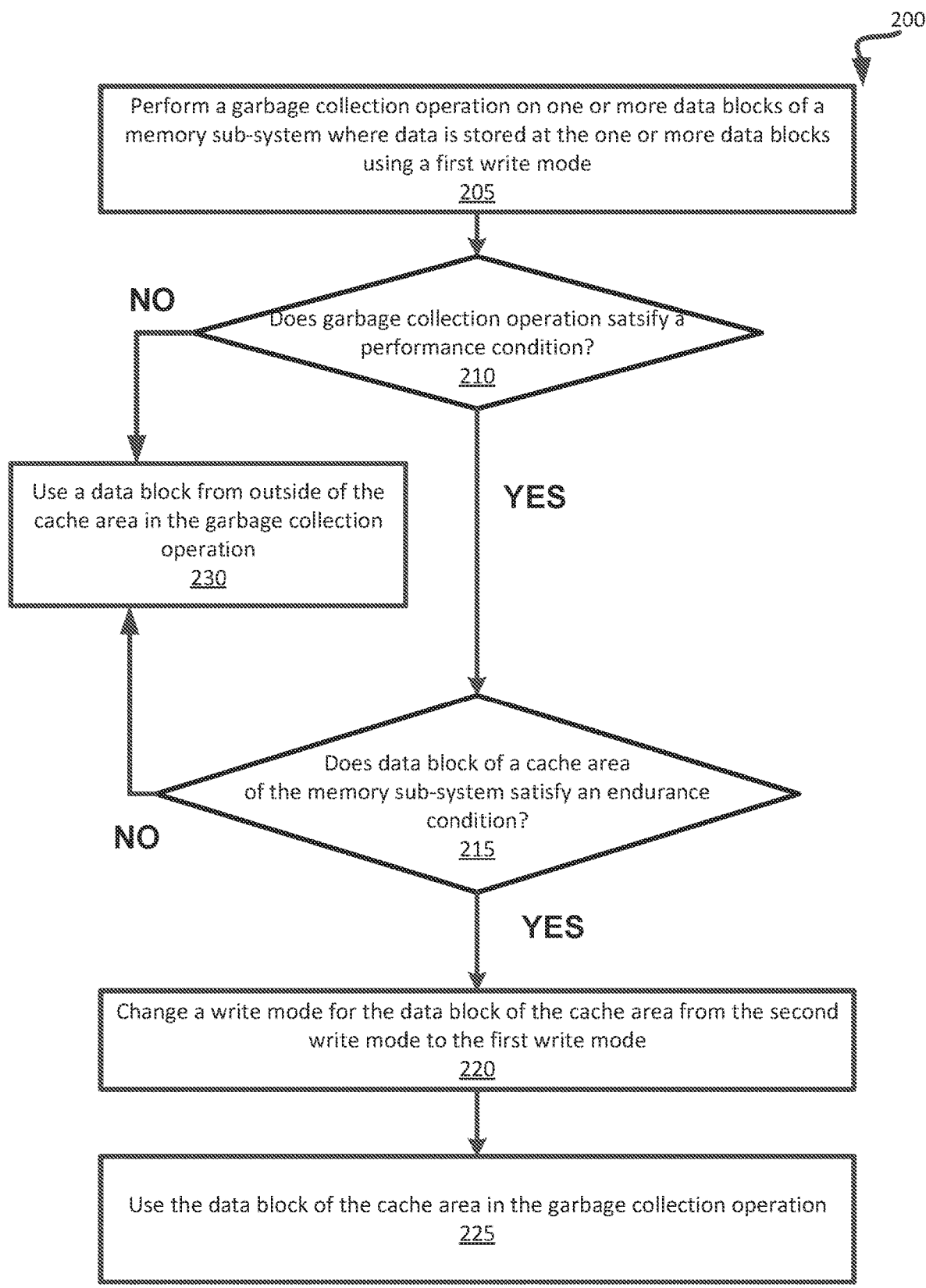
FIG. 2 is a flow diagram of an example method to perform a garbage collection operation based on changing a write mode of a data block in a cache for a memory sub-system.

FIG. 2 is a flow diagram of an example method 200 to perform a garbage collection operation based on changing a write mode of a data block in a cache for a memory sub-system. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the cache manager component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 2, at operation 205, the processing logic performs a garbage collection operation on one or more data blocks of a memory sub-system. Data can be stored at the one or more blocks of the memory subsystem using a write mode that stores data using a particular number of bits per memory cell of a data block. In some implementations, the data can be stored using a write mode with a higher data density than blocks stored in a cache area of the memory sub-system. In one illustrative example, the data can be stored at blocks configured with QLC memory cells while the blocks stored in the cache area can be configured with SLC, MLC, or TLC memory cells (since each have a lower data density than QLC memory cells). In another illustrative example, the data can be stored at blocks configured with TLC memory cells while the blocks stored in the cache area can be configured with SLC or MLC memory cells (since each have a lower data density than TLC memory cells).

At operation 210, the processing logic determines whether the garbage collection operation satisfies a performance condition. In some embodiments, the performance condition can be based on a number of write operations used in the garbage collection operation to write an amount of data to one or more new data blocks (e.g., the write amplification observed during garbage collection). In other words, the performance condition can be based on the number of additional writes incurred during garbage collection to copy valid data from one block to another. Processing logic can monitor the workload conditions of the memory sub-system to determine whether steady state conditions are present based on the observed write amplification. As noted above, a memory sub-system can be in a steady state during periods of high data write volume when garbage collection operations become necessary in parallel with writing new host data to clear data blocks of unneeded data. For example, if the measured write amplification observed at the time of the garbage collection operation meets a threshold, then the performance condition can be satisfied. If, at operation 210, processing logic determines that the performance condition has been satisfied, processing continues to operation 215. Otherwise, processing proceeds to operation 230.

At operation 215, the processing logic determines whether a data block of a cache area of the memory sub-system satisfies an endurance condition. As noted above, in some implementations, data can be stored at the data block of the cache area using a second write mode with a lower data density than the data density of the data blocks accessed by the garbage collection operation. In other words, the second write mode can store data using a number of bits per memory cell of a data block that is less than the number of bits for the blocks written using first write mode write specified at operation 205. For example, if the first write mode is QLC, then the second write mode can be SLC, MLC, or TLC since each have a lower data density than QLC. At operation 215, processing logic can determine whether a data block allocated to the cache area of the memory sub-system has an endurance value that satisfies a threshold value associated with one of the higher data density write modes. For example, if processing logic can compare the endurance of the cache data block against a high threshold endurance value for TLC memory cells. If the observed endurance of the cache data block is less than the TLC endurance threshold, processing logic can determine that the cache data block satisfies the endurance condition, and can be used in TLC mode. If processing logic determines that the data block does satisfy the endurance condition, processing continues to operation 220. Otherwise, processing proceeds to operation 230.

At operation 220, the processing logic changes a write mode for the data block of the cache area from the second write mode to the first write mode. For example, if at operation 215, processing logic determines that the data block of the cache area has an observed endurance that is less than the maximum endurance threshold associated with the higher data density write mode, processing logic can change the write mode of the data block of the cache area from its current write mode (e.g., SLC) to a write mode that has a higher data density (e.g., MLC, TLC, etc.). At operation 225, the processing logic uses the data block of the cache area in the garbage collection operation. In other words, processing logic can now write data to the data block of the cache area during the garbage collection operation using the new higher data density write modes (e.g., one of the XLC modes).

If, at operation 210, processing logic determines that the garbage collection operation does not satisfy the performance condition (e.g., the memory sub-system is not experiencing a steady state workload condition), processing proceeds to block 230 where the garbage collection operation uses a data block from outside the cache area (e.g., the garbage collection operation does not use data blocks from the cache area). Similarly, if at operation 215, processing logic determines that none of the data blocks in the cache area satisfy the endurance condition (e.g., each of the data blocks in the cache have an observed endurance value that exceeds the threshold associated with the higher data density write mode used by the memory sub-system), processing proceeds to block 230 where the garbage collection operation uses a data block from outside the cache area.

Further details with respect the above operations are described below in conjunction with FIG. 3A and FIG. 3B.

Figure 3:
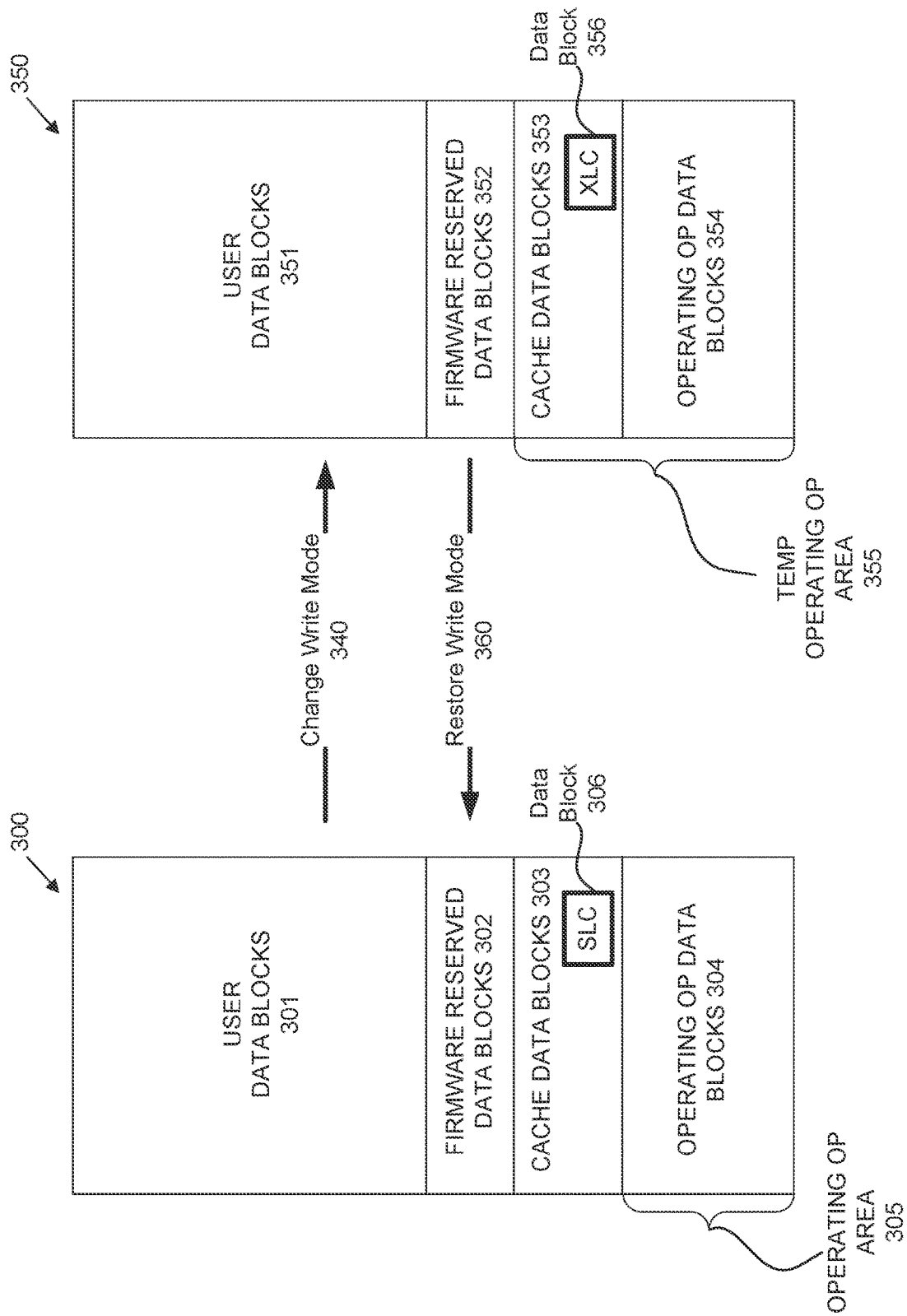
FIG. 3A-3B illustrate examples of data configurations of a memory sub-system while performing a garbage collection operation based on changing a write mode of a data block in a cache in accordance with some embodiments of the present disclosure.

FIG. 3A-3B illustrate examples of data configurations of a memory sub-system while performing a garbage collection operation based on changing a write mode of a data block in a cache in accordance with some embodiments of the present disclosure. In some embodiments, the garbage collection operation can be performed by the cache manager component 113 of FIG. 1 as described above with respect to FIG. 2 and below with respect to FIG. 4.

As shown in FIG. 3A, data configuration 300 can include user data blocks 301, firmware reserve data blocks 302, cache data blocks 303, and operating OP data blocks 304. In some implementations, the overall OP area of data configuration 300 can include the firmware reserve data blocks 302, cache data blocks 303, and operating OP data blocks 304 (e.g., the data blocks not allocated to user data blocks 301). As noted above, the firmware reserved data blocks 302 and cache data blocks 303 can be allocated from the overall OP area of data configuration 300, thereby reducing the operating OP area 305 to include only the operating OP data blocks 304. Also, as noted above, the data blocks allocated to cache data blocks 303 (e.g., data block 306) can be configured to be written using a low density write mode (e.g., SLC).

As noted above, as host data is received by the memory sub-system to be written, it can be written to cache data blocks 303 first and then later moved to a data block in user data blocks 301. As data continues to be written to the memory sub-system, cache data blocks 303 may begin to fill up, causing subsequently received host data to be written to user data blocks 301 directly. As writes continue to be processed, the available space is reduced, causing the need for garbage collection operations to clear data blocks of unneeded data. As noted above, during periods of heavy write volume, the memory sub-system may experience steady state conditions where garbage collection is occurring concurrently with new data writes.

As described above with respect to FIG. 2, during a garbage collection operation the workload performance (e.g., the observed write amplification) of the memory sub-system is monitored to assess whether steady state conditions exist (e.g., whether it satisfies a performance condition). The garbage collection operation can satisfy the performance condition if the write amplification of data blocks at the time of the garbage collection operation meets or exceeds a threshold value. Write amplification, as described above, is based on the number of write operations used in the garbage collection operation to write an amount of data to one or more new data blocks. For example, in order to write 1 Gb of host data to the memory sub-system, garbage collection can sometimes involve multiple write or rewrite operations that result in writing far more than the 1 Gb host data. Thus, effectively writing a total of 2 Gb of data to process 1 Gb of host data during garbage collection can yield a write amplification value of 2. During steady state conditions, the number of write operations can be a large multiplier of the amount of host data to be written.

If the garbage collection operation satisfies the performance condition (e.g., if steady state conditions are observed based on the garbage collection write amplification), the cache data blocks 303 can be analyzed to determine if any can be used to supplement the operating OP area 305. The cache manager can then select a data block 306 from cache data blocks 303 to determine whether that data block satisfies an endurance condition for an XLC write mode. In some implementations, the endurance condition corresponds to a threshold number of write operations using the XLC write mode that have been performed on data block 306. In other words, the endurance condition can represent the maximum number of program/erase cycles that can be used for an XLC write mode before the memory cell of the data block becomes unreliable.

For example, if user data blocks 301 and operating OP data blocks 304 are configured to use a TLC write mode, then the cache manager can compare the observed endurance value for data block 306 to the endurance threshold for the TLC write mode. Similarly, if other higher data density write modes (e.g., MLC, QLC, etc.) are used by the memory sub-system, the cache manager may use the endurance threshold for the write mode being used. The endurance condition can, therefore, ensure that a data block in the cache is suitable for a higher density write mode prior to switching to that write mode.

In some implementations, the cache manager may determine whether data block 306 satisfies the endurance condition by first determining whether an average endurance value for all data blocks in cache data blocks 303 satisfies the endurance condition. If the average endurance for the entire cache data blocks 303 satisfies the endurance condition, the cache manager can then select a data block 306. If the average endurance value does not satisfy the endurance condition, then this can indicate that there are no data blocks in cache data blocks 303 that can support an XLC write mode. In such instances, the cache data blocks 303 can be used only for cache operations and any write mode switching for any subsequent garbage collection operations can be disabled or bypassed.

If the cache manager determines that the garbage collection operation meets the performance condition (e.g., the write amplification has met or exceeded a threshold during steady state garbage collection) and at least one data block in the cache data blocks 303 meets an endurance condition (e.g., data block 306 can support an XLC write mode), then the cache manager can perform change write mode 340 to change the write mode of data block 306 (e.g., increase the data density for data block 306 to support an XLC write mode).

Change write mode 340 can then modify data configuration 300 to result in the data configuration 350 of FIG. 3B. As shown in FIG. 3B, data configuration 350 can include user data blocks 351, firmware reserve data blocks 352, cache data blocks 353, and operating OP data blocks 354. As with data configuration 300, the overall OP area of data configuration 350 can include the firmware reserve data blocks 352, cache data blocks 353, and operating OP data blocks 354 (e.g., the data blocks not allocated to user data blocks 351). However, performing change write mode 340 can increase the operating OP area to include some or all of cache data blocks 353 (e.g., as illustrated by temp operating OP area 355). Additionally, a result of performing change write mode 340, data blocks allocated to cache data blocks 353 (e.g., data block 356) can be configured to be written using a higher density write mode (e.g., XLC). In some implementations, some of the data blocks in cache data blocks 353 may not satisfy the endurance condition (e.g., some blocks may have endurance values that exceed the XLC threshold). In such instances, these blocks can be restricted from being used in XLC mode for garbage collection.

As garbage collection operations continue, the cache manager can continue to monitor the ongoing workload conditions (e.g., observed write amplification) of the memory sub-system to determine when steady state conditions have ceased. If the cache manager determines that subsequent garbage collection operation do not meet the established performance condition (e.g., the observed write amplification has fallen below a threshold during steady state garbage collection), restore write mode 360 may be performed to switch the write mode for data blocks in cache data blocks 353 back its previous state (e.g., restore the write mode configuration to SLC mode). Thus, the data blocks in the cache can be used in XLC mode for the duration of the steady state conditions, but restored to SLC mode when those conditions have ceased. Restoring the write mode of cache data blocks to their original configuration is described in further detail below with respect to FIG. 4.

Note that for illustrative purposes, FIGS. 3A-3B depict switching the write mode of cache data block 306 from SLC to an XLC write mode, in various implementations aspects of the present disclosure may be implemented to use other write modes. For example, in some implementations cache data block 306 may be initially configured with MLC memory cells and subsequently switched to TLC or QLC memory cells.

Figure 4:
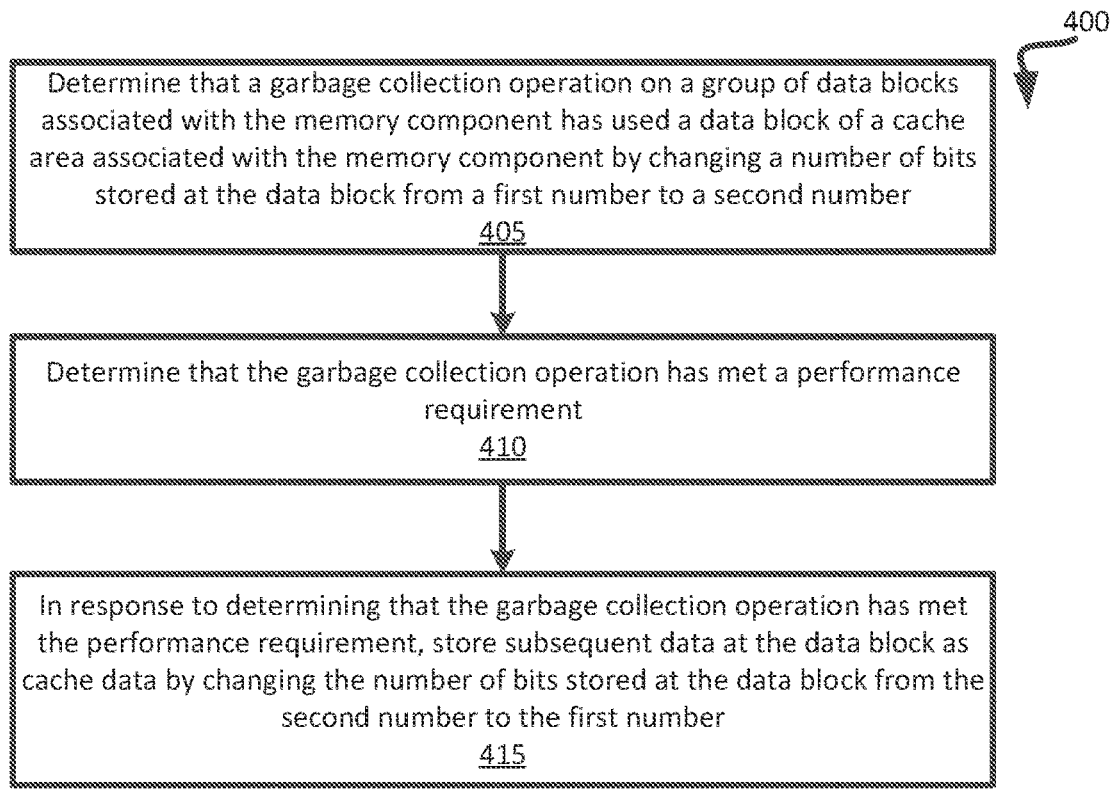
FIG. 4 is a flow diagram of an example method to restore the write mode of cache data blocks after performing a garbage collection operation based on changing the write mode for a memory sub-system.

FIG. 4 is a flow diagram of an example method 400 to restore the write mode of cache data blocks after performing a garbage collection operation based on changing the write mode for a memory sub-system in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the cache manager component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel.

Additionally, one or more processes can be omitted in various embodiments. Thus, not all processes are required in every embodiment. Other process flows are possible.

As shown in FIG. 4, at operation 405, the processing logic determines that a garbage collection operation on a group of data blocks associated with the memory device has used a data block of a cache area associated with the memory device by changing a number of bits stored at the data block from a first number to a second number, where the first number is less than the second number. As noted above with respect to FIG. 2 and FIG. 3A-3B, in some implementations, the garbage collection operation can use the data block of the cache area by switching the write mode of the data block from a low data density mode with fewer bits stored at the data block to a higher data density mode with more bits stored at the data block. For example, the write mode of a data block configured with SLC memory cells can be switched to one of the XLC write modes. Similarly, the write mode of a data block configured with MLC memory cells can be switched to TLC or QLC write modes.

At operation 410, the processing logic determines that the garbage collection operation has met a performance requirement. In some implementations, the performance requirement can be based on a number of write operations used in the garbage collection operation to write an amount of data to one or more new data blocks (e.g., the write amplification observed during garbage collection). Processing logic can monitor the workload conditions of the memory sub-system to determine when steady state conditions are no longer present based on the observed write amplification. For example, if the measured write amplification observed at the time of the garbage collection operation falls below a high threshold value, then the performance requirement can be satisfied.

At operation 415, in response to determining that the garbage collection operation has met the performance requirement, the processing logic stores subsequent data at the data block as cache data by changing the number of bits stored at the data block from the second number (e.g., the number of bits for the higher data density write mode) to the first number (the number of bits for the lower data density write mode). As described above, processing logic can restore the write mode of the data block to its original write mode that was present prior to encountering steady state workload conditions. For example, if the data blocks in the cache area were initially configured with SLC memory cells and subsequently switched to an XLC write mode, processing logic can change the write mode for data blocks in the cache area of the memory sub-system from an XLC write mode back to their originally configured SLC write mode.

Figure 5:
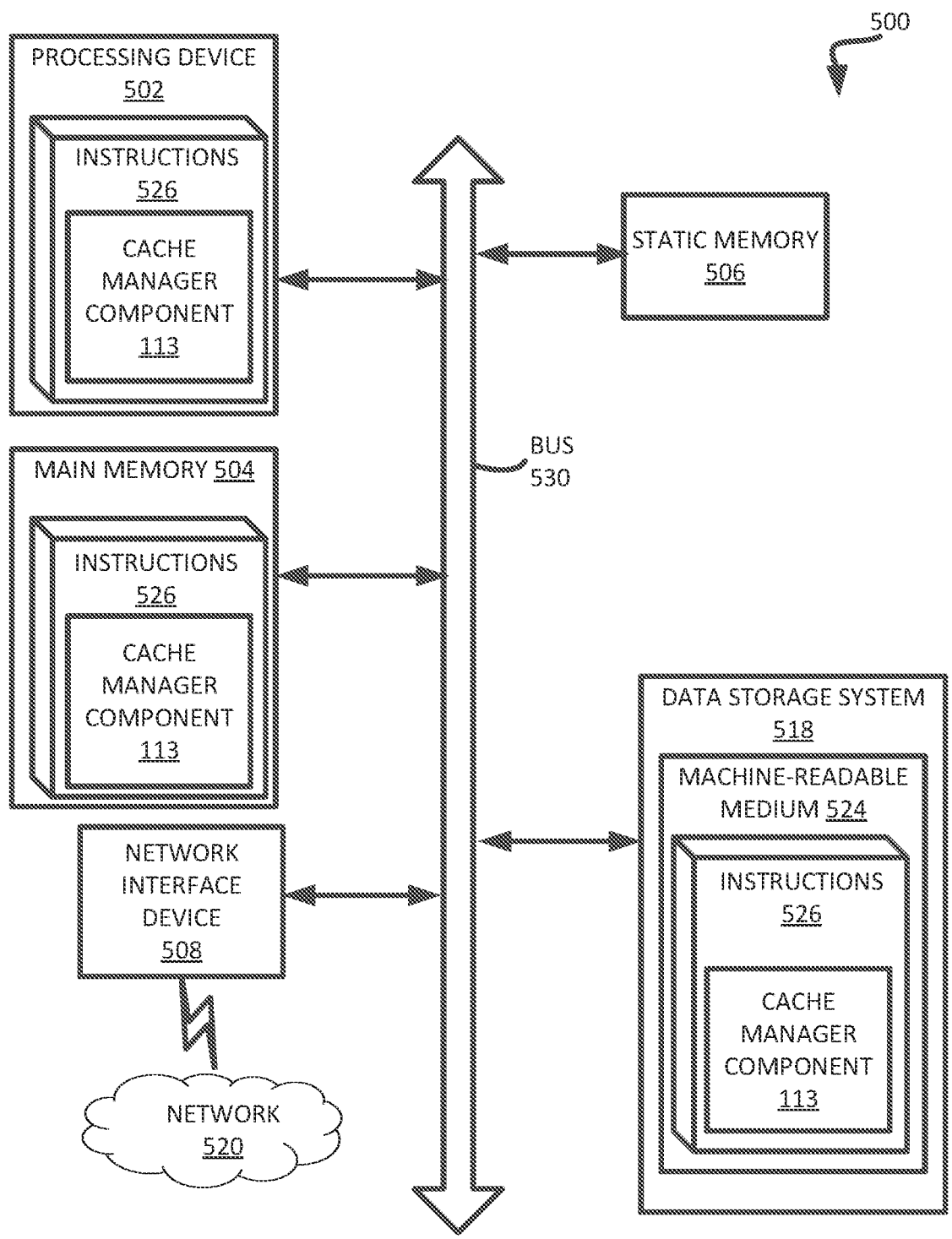
FIG. 5 is a block diagram of an example computer system in which implementations of the present disclosure can operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to cache manager component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, digital or non-digital circuitry, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 602 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a cache manager component (e.g., the cache manager component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   receiving, by a processing device, an indication that a media management operation performed with respect to a block of a memory sub-system satisfies a performance condition, wherein the block maintains first data stored using a first write mode;
   in response to receiving the indication, determining, by the processing device, that a cache block of a cache area of the memory sub-system satisfies an endurance condition, wherein the cache block maintains second data stored using a second write mode; and
   changing, by the processing device, a write mode for the cache block from the second write mode to the first write mode responsive to determining that the cache block satisfies the endurance condition.

2. The method of claim 1, wherein the first write mode stores the first data in a first number of bits per memory cell, and wherein the second write mode stores the second data in a second number of bits per memory cell less than the first number of bits.

3. The method of claim 1, wherein the performance condition is based on a number of write operations used in the media management operation to write an amount of data to one or more new blocks.

4. The method of claim 1, wherein the endurance condition corresponds to a threshold number of write operations using the first write mode that have been performed on the cache block.

5. The method of claim 1, wherein the first write mode comprises at least one of a multi-level cell (MLC) mode, a triple-level cell (TLC) mode, and a quad-level cell (QLC) mode, and wherein the second write mode comprises a single-level cell (SLC) mode.

6. The method of claim 1, wherein determining whether the cache block satisfies the endurance condition further comprises:
   determining whether an average endurance value for the cache area satisfies the endurance condition, wherein the average endurance value corresponds to an average number of write operations using the first write mode that have been performed on a plurality of additional cache blocks associated with the cache area; and
   responsive to determining that the average endurance value for the cache area satisfies the endurance condition, selecting the cache block from the plurality of additional cache blocks associated with the cache area.

7. The method of claim 1, further comprising using, by the processing device, the cache block in the media management operation.

8. A system comprising:
   a memory component; and
   a processing device, operatively coupled with the memory component, to perform operations comprising:
      receiving an indication that a media management operation performed with respect to a block of a memory sub-system satisfies a performance condition, wherein the block maintains first data stored using a first write mode;
      in response to receiving the indication, determining that a cache block of a cache area of the memory subsystem satisfies an endurance condition, wherein the cache block maintains second data stored using a second write mode; and changing a write mode for the cache block from the second write mode to the first write mode responsive to determining that the cache block satisfies the endurance condition.

9. The system of claim 8, wherein the first write mode stores the first data in a first number of bits per memory cell, and wherein the second write mode stores the second data in a second number of bits per memory cell less than the first number of bits.

10. The system of claim 8, wherein the performance condition is based on a number of write operations used in the media management operation to write an amount of data to one or more new blocks.

11. The system of claim 8, wherein the endurance condition corresponds to a threshold number of write operations using the first write mode that have been performed on the cache block.

12. The system of claim 8, wherein the first write mode comprises at least one of a multi-level cell (MLC) mode, a triple-level cell (TLC) mode, and a quad-level cell (QLC) mode, and wherein the second write mode comprises a single-level cell (SLC) mode.

13. The system of claim 8, wherein determining whether the cache block satisfies the endurance condition further comprises:

determining whether an average endurance value for the cache area satisfies the endurance condition, wherein the average endurance value corresponds to an average number of write operations using the first write mode that have been performed on a plurality of additional cache blocks associated with the cache area; and responsive to determining that the average endurance value for the cache area satisfies the endurance condition, selecting the cache block from the plurality of additional cache blocks associated with the cache area.

14. The system of claim 8, wherein the operations further comprise using the cache block in the media management operation.

15. A non-transitory computer readable medium comprising instructions, which when executed by a processing device, cause the processing device to perform operations comprising:

receiving an indication that a media management operation performed with respect to a block of a memory sub-system satisfies a performance condition, wherein the block maintains first data stored using a first write mode;

in response to receiving the indication, determining that a cache block of a cache area of the memory sub-system satisfies an endurance condition, wherein the cache block maintains second data stored using a second write mode; and changing a write mode for the cache block from the second write mode to the first write mode responsive to determining that the cache block satisfies the endurance condition.

16. The non-transitory computer readable medium of claim 15, wherein the first write mode stores the first data in a first number of bits per memory cell, and wherein the second write mode stores the second data in a second number of bits per memory cell less than the first number of bits.

17. The non-transitory computer readable medium of claim 15, wherein the performance condition is based on a number of write operations used in the media management operation to write an amount of data to one or more new blocks.

18. The non-transitory computer readable medium of claim 15, wherein the endurance condition corresponds to a threshold number of write operations using the first write mode that have been performed on the cache block.

19. The non-transitory computer readable medium of claim 15, wherein determining whether the cache block satisfies the endurance condition further comprises:

determining whether an average endurance value for the cache area satisfies the endurance condition, wherein the average endurance value corresponds to an average number of write operations using the first write mode that have been performed on a plurality of additional cache blocks associated with the cache area; and responsive to determining that the average endurance value for the cache area satisfies the endurance condition, selecting the cache block from the plurality of additional cache blocks associated with the cache area.

20. The non-transitory computer readable medium of claim 15, wherein the operations further comprise using the cache block in the media management operation.

* * * * *